Jan. 26, 1937.  J. A. RICE ET AL  2,069,078
APPARATUS FOR PRODUCING CELLULAR CEMENTITIOUS MATERIALS
Filed Dec. 15, 1934  2 Sheets-Sheet 1
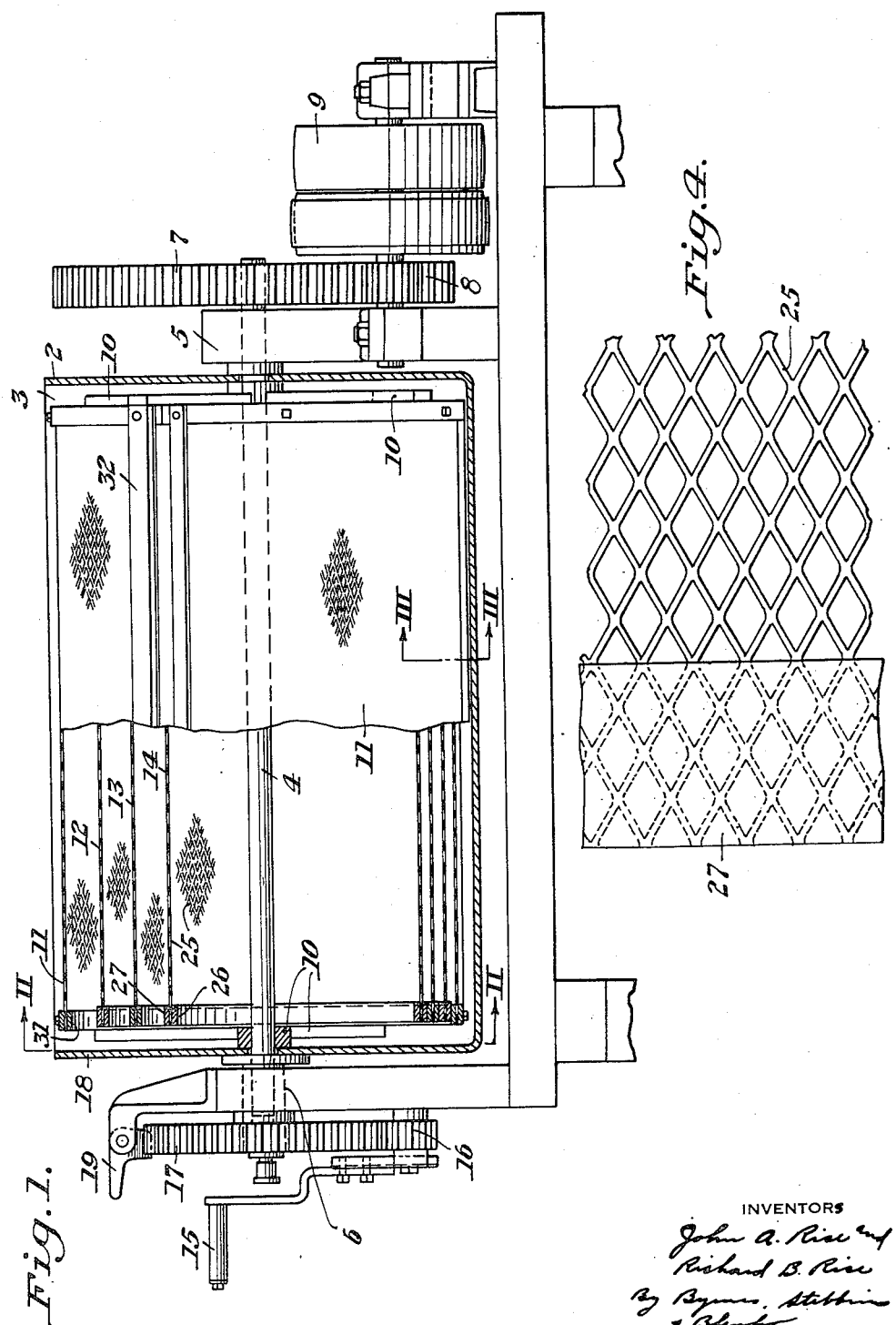
INVENTORS

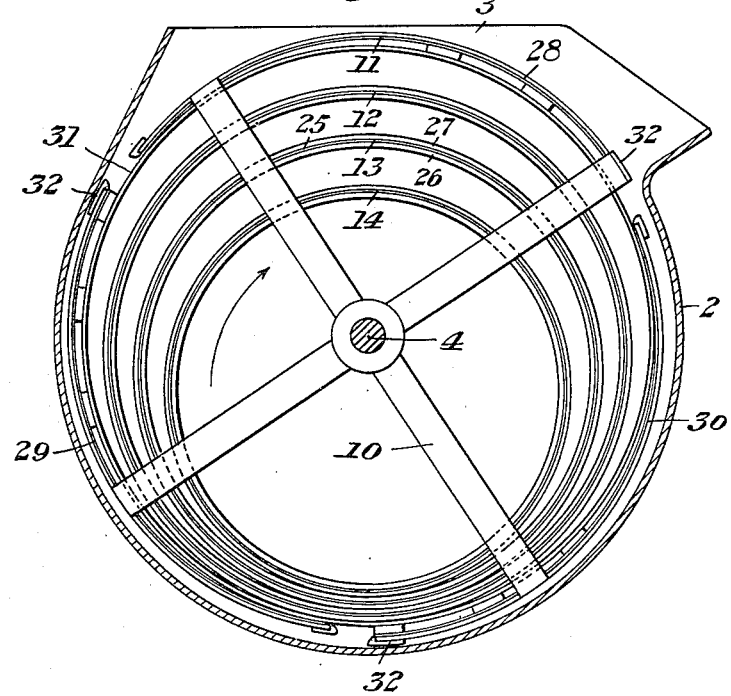
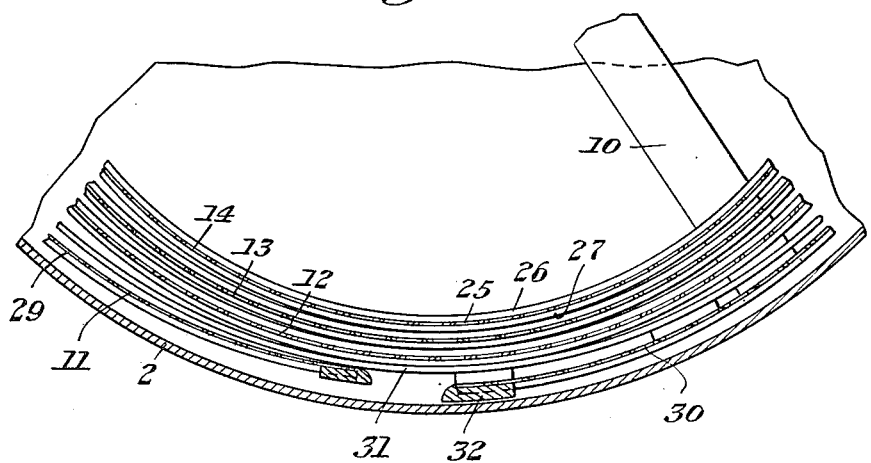

Patented Jan. 26, 1937

2,069,078

UNITED STATES PATENT OFFICE 2,069,078

APPARATUS FOR PRODUCING CELLULAR CEMENTITIOUS MATERIALS

John A. Rice and Richard B. Rice, Berkeley, Calif., assignors to Bubblestone Company, Berkeley, Calif., a corporation of Pennsylvania Application December 15, 1934, Serial No. 757,635

8 Claims. (Cl. 83—73)

The present invention relates generally to the manufacture of cellular cementitious materials, and more particularly to an apparatus for carrying out the manufacture of such material.

This so-called "cellular concrete" is highly desirable in the construction field as it combines the qualities of lightness, heat insulation and reasonable strength. This lightness is obtained by introducing air or other gas into the cement slurry while it is in a pliable state.

Various different methods or processes are known and practiced for introducing air or other gas into the cement slurry, imparting thereto a cellular structure which remains after the material has set. Among these various methods or processes the following may be mentioned as illustrative of the subject matter to which the present application relates.

One method consists in introducing a metallic powder into the cement slurry whereby the action of the calcium hydrate of the cement sets free hydrogen gas, forming bubbles in the mix. The mixture is allowed to stand quietly until set, and then it is cured in the usual manner of curing cement products.

Another method consists in making a cement slurry and a tenacious foam in separate containers, and then mixing the two whereby the air cells of the foam retain their structure, and impart a cellular structure to the resulting mix, which retains this cellular structure while the material is allowed to set and while it is being cured.

Another method consists in making a cement slurry and introducing air or gas into the slurry and entrapping it there, thereby imparting to the slurry a cellular structure which will be retained during the setting and curing of the material.

There are several factors or conditions essential to the success of the various processes of making cellular cementitious materials. A liquid must be present in the cement slurry which will impart to the slurry several qualities. It must provide a condition of surface tension such that when air cells are formed within the slurry, they will remain separate from one another and not collapse or break into one another, thus defeating the object in view, namely, the forming of a permanent cellular structure. The envelope of the gas cells formed by introducing air or other gas into the slurry must remain sufficiently strong, tenuous and permanent while the cement is setting, so that the cellular structure will not be broken down by the chemical action taking place in the crystallization of the cement. Having this quality, the cells will remain unbroken for a sufficient period of time (approximately six hours in the case of Portland cement) to permit the cement to harden sufficiently to support the cellular structure, the wall of the cell envelope being finally absorbed by the setting cement. Furthermore, the liquid constituting the envelope of the gas cell in the cellular product must be of such a nature not to chemically act upon the cement and thus impair its ultimate strength or hardness after the curing interval.

Another condition essential to the success of processes of this character is that the process of introducing the gas cells into the cement slurry must be such that cells of suitable size are formed in large numbers and homogeneously mixed with the slurry without the use of an excessive amount of the cell solution.

The present invention relates particularly to the method of producing cellular cementitious materials wherein the gas or air is introduced directly into the cementitious slurry and, by our invention, we provide a new apparatus whereby a large number of minute air cells may be rapidly incorporated in the cementitious slurry and distributed therethrough. If the slurry used contains a suitable proportion of the cell solution which has the quality among others of imparting tenacity to the bubble films, then the cells will remain in suspension in the cementitious slurry while the latter is being aerated to the desired degree and while the aerated slurry is being transferred from the apparatus to the molds or forms in which it is to harden, and also during the setting period.

The apparatus which we provide consists essentially of a series of perforated cylinders, one within another, which revolve about horizontal axes in a cylindrical container. The outermost cylinder is made to revolve by means of a set of radial arms at each end of the cylinder which are rigidly fastened to the shaft and to the cylinder. The inner cylinders are not attached to the shaft but roll freely within the outermost cylinder. When the container in which the perforated cylinders are mounted is partly filled with the cementitious slurry containing a suitable cell solution, the revolving cylinders entrap air from the atmosphere in perforations and carry it beneath the surface of the slurry in the form of bubbles. It is here further broken up into smaller bubbles which will remain suspended in the slurry.

In the accompanying drawings, we have shown for purposes of illustration only a preferred embodiment of our invention. It will be understood, of course, that our invention is not limited to the particular apparatus shown in the drawings as it may be embodied otherwise in apparatus wherein air is entrapped by a reticular structure, and carried thereby into the slurry.

In the drawings,—

Figure 1 is a front elevational view partly in section showing the presently preferred embodiment of our invention;

Figure 2 is a sectional view taken along the line II—II of Figure 1;

Figure 3 is a sectional view taken along the line III—III of Figure 1; and

Figure 4 is a detail view showing one form of the reticular structure of which the rotating cylinder may be formed.

In the embodiment shown in the drawings there is provided a container 2 having a top opening 3 for receiving the cement slurry to be aerated. This container is preferably cylindrical and may be constructed of heavy sheet metal. The container 2 is mounted loosely on a shaft 4 which is carried in end bearings 5 and 6 to revolve therein. The shaft 4 may be actuated by any suitable driving mechanism, such as gears 7 and 8 driven by a motor or the like 9.

A spider 10 is provided adjacent each end of the container and rigidly secured to the shaft 4 for rotation therewith. The outer cylinder 11 is rigidly secured to the arms of the spider 10 for rotation with the shaft 4. Inner cylinders 12, 13 and 14 are provided but, as will be more specifically pointed out hereinafter, they are not connected with the rotating shaft 4.

In order to discharge the container 2 a crank 15 and gears 16 and 17 are provided and connected with the end wall 18 of the container. When the crank is turned, the container is tilted about its axis independently of the shaft 4 and the cylinders 11, 12, 13 and 14. Ordinarily, while the apparatus is in operation and aeration is being accomplished, the container is held stationary by locking the gear 17 and crank 15 by means of a dog 19, which is adapted to co-operate with the gear 17.

The inner cylinders 12, 13 and 14 are of graded diameters and smaller than the outer cylinder 11. Each inner cylinder is formed of a perforated or reticular body portion 25. An inner metal band 26 and an outer metal band 27 is provided at each end of each of the inner cylinders. These metal bands or rings hold the perforated body portion in cylindrical shape and also serve as tracks upon which the cylinders roll, the outside rings of one cylinder rolling upon the inside rings of the next larger cylinder. It is desirable by some such means as this to prevent contact between the perforated material in adjacent cylinders in order to reduce abrasion of the thin perforated material to a minimum. The inner cylinders 12, 13 and 14 are only slightly shorter than the distance between the spider 10 fastening the outermost cylinder to the shaft, and hence the arms of the spider serve to restrict the endwise motion of the inner cylinders and to keep them on their tracks.

The primary function of the perforated cylinders is to entrap air in their perforations and carry it beneath the surface of the slurry in the form of small bubbles. To this end the outermost cylinder may be a true cylinder with continuous perforated surface like the inner cylinders above described. However, we have found it desirable to construct the outermost cylinder in a somewhat different manner. We have found it desirable to divide the outer cylinder 11 into three equal sectors 28, 29 and 30 by cutting the cylinder along three lines equally spaced, and running parallel to the axis thereof. We have found that three sectors is a convenient number, although it will be understood that more or less sectors may be utilized in the formation of the outer cylinder. The edge of each sector which is to be the leading edge when the apparatus is revolving in its proper direction is moved radially outward a small distance, and there fastened by suitable means to the rings 31. This results in each sector being part of a spiral whose form tends to move radially inward as the apparatus revolves. The following ends of each sector are likewise suitably secured to the end rings 31. The end rings 31 are suitably secured to the spider 10 so that rotation of the shaft 4 will cause rotation of the outer cylinder. A gap is preferably left between the leading edge of each sector and the trailing edge of the preceding sector.

The purpose of slightly raising the leading edge of each sector and providing a gap between it and the following sector is to break up large masses of dry materials which may be suddenly dumped in the cylinder and to force the masses of material into the interior of the outermost cylinder where the material will be further broken up by being pressed between the outermost cylinder and its adjacent inner cylinder. Were this provision not made, masses of dry materials falling on the outer cylinder would tend to stick to it and blind its perforations, and the material would not be quickly broken up and mixed with the water in the container.

A stiff scraper blade 32 is mounted on the leading edge of each scraper to scrape stiffened slurry from the side walls of the container and to force the material into the outermost cylinder.

In operation the water is first put into the container 2 and then the cement and the sand or other aggregate are dumped into the container onto the outermost cylinder. As the outermost cylinder is rotated the material is forced through the perforations thereof into the space between the outermost cylinder and the adjacent cylinder, and further rotation effects a movement of this material through the perforations of the other rotating cylinders. As the cylinders are rotated the perforations thereof entrap air which is carried downwardly into the slurry in the container. These bubbles remain entrapped in the material and form a cellular mix.

The efficiency of each cylinder, that is, the quantity of bubbles per minute carried by it into the slurry is determined largely by its peripheral speed, and is greatest at a peripheral speed between 2,500 and 2,800 inches per minute. At subsequently higher speeds, the efficiency decreases due to the too violent action which results in the breakage of a large proportion of the bubbles made. At subsequently lower speeds the efficiency decreases due to the fact that fewer bubbles are formed in the mix. Hence it is desirable to have all of the cylinders revolving as near as practicable at the same peripheral speed. This has been accomplished by having the freely rolling arrangement of inner cylinders above described, since the distance between adjacent cylinders is slight at the point of contact of the rings and the innermost cylinder has only slightly less peripheral speed than the outermost cylinder. Were the cylinders mounted concentrically, they would have to be separated by a space great enough to prevent clogging by dry materials and the innermost cylinder would have a peripheral speed a great deal less than that of the outermost cylinder. This would materially reduce its efficiency.

Many of the bubbles carried into the slurry by the perforations in the cylinders are relatively large and have a tendency to come to the surface and break. An important function of the cylinders is to divide these larger bubbles into bubbles small enough to remain suspended in the slurry. The space between any two points on adjacent cylinders alternately increases and decreases during each revolution, thus forcing the slurry back and forth through the perforations in the cylinders. As the large bubbles pass through several thicknesses of perforated material, they are broken up into smaller bubbles, and remain in the mix. Thus the fact that the cylinders are freely rolling, thereby causing currents of the partly aerated slurry to flow through the perforations, materially increases the capacity of the apparatus for introducing a large number of small bubbles into the slurry in a short period of time.

If the cylinders were made concentric or otherwise held in a fixed relation to one another, large quantities of dry materials would, when added rapidly, tend to form stiff, putty-like masses between the outermost cylinder and the adjacent inner cylinder, and some time would be required for these masses to be washed away and reduced to liquid slurry by the water. This clogging is prevented by having the inner cylinders rolling since at any point the distance between adjacent cylinders is continually changing.

The perforated material of which the cylinders are made may consist of woven wire cloth, perforated sheet metal, or other perforated material. The most suitable material we have found is expanded metal, one-half inch mesh, with the individual metal strips which separate the perforations flattened by running the material through a pair of rolls. As shown in Figure 4 of the drawings, the perforations are diamond shaped, and the cylinders should be so constructed that the longer dimension of the diamond is lengthwise of the cylinders.

In the drawings, we have shown a structure embodying one outer and three inner cylinders having reticular walls. The number of cylinders required depends upon the diameter of the container. We have found four cylinders desirable for a 30 inch diameter container. Six, however, would be required to make a batch of cellular concrete in an equal mixing time in a 37 inch container. In general, it may be said that the number of cylinders required will be approximately proportional to the square of the diameter of the container.

In our Patent No. 1,769,309, several types of apparatus for aerating a cementitious slurry are shown. In the structures shown therein the air is injected into the mix, either by means of a perforated blade and an air chamber for forcing jets of air into the slurry or by carrying the air beneath the surface of the slurry by means of a revolving bucket wheel. One of the advantages of the present invention is that the air is entrapped by the perforated cylinders themselves and carried beneath the surface of the slurry, thereby dispensing with the use of a perforated blade and an air chamber or a revolving bucket wheel. Another advantage of the apparatus which we provide by our invention over the apparatus disclosed in the aforesaid patent resides in the fact that we have dispensed with the use of the helical bands for removing thickened slurry from the container and causing currents thereof running in an axial direction of the container. We have found that the agitation caused by the revolving perforated cylinders is sufficient to ensure homogeneous mixing. The elimination of such helical bands materially reduces the cost of manufacturing apparatus of this character. Any thickened slurry which forms on the inner surface of the container may be removed by the straight scraper blades mounted on the outermost cylinder and extending parallel to the rotating shaft.

By making the axis of the machine of a length equal to at least twice the diameter or more, the machine may function as a continuous aerator. Under such conditions the slurry and the cell solution would be introduced at one end of the machine and the aerated material discharged at the other end. To regulate the discharge, the axis of the machine may be tilted at an angle to the horizontal, the angle to be utilized being chosen so as to effect most efficient results. The feed also may be suitably regulated in order to properly regulate the discharge.

While the above described machine consists of rolling perforated cylinders operating within a perforated revolving cylinder, the outer perforated cylinder is not absolutely essential to accomplish the desired results. For instance, a set of the perforated cylinders may be mounted within the container of an ordinary revolving concrete mixer in such a way that the machine may be used for all the purposes herein stated, thus adapting the concrete mixer to the making of cellular concrete.

In the manufacturing of cellular cementitious materials in the apparatus above described, various types of cell solutions may be used. Examples of several cell solutions are given in our Patent No. 1,769,309, and reference is hereby made to this patent for a description of an appropriate cell solution.

In operation the water is first added to the aerator and then the cement and sand are introduced. After the slurry has become homogeneously and smoothly mixed, the cell solution is added. The revolving cylinders will mix air bubbles into the slurry and in the presence of the cell solution the air bubbles will appropriate protective envelopes from the cell solution so that after a few minutes of operation the contents of the apparatus will have materially increased in volume and will embody a large number of cells which will remain in the mix until the mix has been transferred from the container and used and allowed to harden.

While the apparatus provided by our invention has been described as an apparatus for the manufacture of cellular cementitious materials, it will be understood that the apparatus which we provide is of such design that it will be useful for other purposes, and such other purposes are within the contemplation of our invention. The apparatus which we provide may be used to aerate any kind of a foamy solution very efficiently, forming a stiff foam. Our invention is particularly adapted to the aeration of viscous or thick liquids or pasty materials, as well as slurries made from the mixing of various solids and liquids. For example, it may be used in the beating of eggs for use in bakeries, the beating of cake dough or paste for making "sponge cake", or it may be used for the aeration of plastic clay in water slurries. Our invention may also be utilized for various other kindred purposes.

While we have shown a preferred embodiment of our invention, it will be understood that our invention is not limited to the particular structure shown in the drawings, but may be otherwise embodied within the scope of the appended claims.

We claim:

1. An aerator of the character described, comprising a container, an outer perforated cylinder mounted for rotation within the container, means including a driven shaft for rotating said cylinder about the axis thereof, and a plurality of perforated cylinders of graded diameters mounted one within the other and within said first-mentioned perforated cylinder, each of said inner cylinders being freely revoluble in the outer cylinder and having rings thereon cooperating with adjacent rings of an adjacent cylinder to provide bearing supports between said cylinders.

2. In apparatus of the character described, a container for cementitious slurry, an outer perforated cylinder mounted for rotation within said container, said outer cylinder being formed of a plurality of sectors each of which forms a portion of a spiral curve with the leading edge thereof extending outwardly from the general plane of the cylinder, means for rotating the outer cylinder, and an inner perforated cylinder within said outer cylinder and freely revoluble therein.

3. In apparatus of the character described, a container for cementitious slurry, an outer perforated cylinder mounted for rotation within said container, said outer cylinder being formed of a plurality of sectors of perforated material, each of which forms a portion of a spiral curve with the leading edge thereof extending outwardly from the general plane of the cylinder, the leading edge of one sector being circumferentially spaced from the trailing edge of an adjacent sector, means for rotating the outer cylinder, and an inner perforated cylinder within said outer cylinder and freely revoluble therein.

4. In apparatus of the character described, a container for cementitious slurry, an outer perforated cylinder mounted for rotation within said container, said outer cylinder being formed of a plurality of sectors of perforated material, each of which forms a portion of a spiral curve with the leading edge thereof extending outwardly from the general plane of the cylinder, means including a driven shaft for rotating the outer cylinder, a scraper bar carried by the leading edge of at least one of said sectors for removing stiffened slurry from the side walls of the container, and an inner perforated cylinder within and wholly supported by said outer cylinder and freely revoluble therein.

5. In apparatus of the character described, a container for cementitious slurry, an outer perforated cylinder mounted for rotation within said container, said outer cylinder being formed of a plurality of sectors each of which forms a portion of a spiral curve with the leading edge thereof extending outwardly from the general plane of the cylinder, means for rotating the outer cylinder, and an inner perforated cylinder carried by said outer cylinder and freely revoluble therein, said outer cylinder having rings adjacent the edges thereof for cooperation with rings carried by the inner cylinder to provide supporting surfaces therefor.

6. In apparatus of the character described, a container for cementitious slurry, an outer perforated cylinder mounted for rotation within the container, means including a driven shaft for rotating said cylinder about the axis thereof, said cylinder having a supporting ring at each end thereof, and a plurality of perforated cylinders of graded diameters mounted one within the other and within said first-mentioned perforated cylinder, each of said inner cylinders being freely revoluble in the outer cylinder and having rings at each end thereof adapted to cooperate with the rings carried by adjacent cylinders.

7. In apparatus of the character described, a container for cementitious slurry, an outer perforated cylinder mounted for rotation within said container, said outer cylinder being formed of a plurality of sectors each of which forms a portion of a spiral curve with the leading edge thereof extending outwardly from the general plane of the cylinder, means for rotating the outer cylinder, and an inner perforated cylinder within said outer cylinder and freely revoluble therein, said inner cylinder having a diameter only slightly less than the diameter of the outer cylinder and being wholly supported by said outer cylinder.

8. In apparatus of the character described, a container for cementitious slurry, an outer perforated cylinder mounted for rotation within said container, said outer cylinder being formed of a plurality of sectors each of which forms a portion of a spiral curve with the leading edge thereof extending outwardly from the general plane of the cylinder, means for rotating the outer cylinder, an inner perforated cylinder within said outer cylinder and freely revoluble therein, said inner cylinder having a diameter only slightly less than the diameter of the outer cylinder, and said outer cylinder having a diameter only slightly less than that of the container in which it is mounted.

JOHN A. RICE.
RICHARD B. RICE.